United States Patent
Leu

[19]

[11] Patent Number: 6,058,600
[45] Date of Patent: May 9, 2000

[54] WIRE TERMINATION TOOL AND METHOD FOR PRODUCING THE SAME

[75] Inventor: Sam Leu, Tujunga, Calif.

[73] Assignee: Light Development Concepts, Inc., Moorpark, Calif.

[21] Appl. No.: 08/864,554

[22] Filed: May 28, 1997

[51] Int. Cl.[7] .................................................. H01R 43/04
[52] U.S. Cl. ............................................ 29/751; 29/566.4
[58] Field of Search ............................. 29/751, 753, 861, 29/505, 866

[56] References Cited

U.S. PATENT DOCUMENTS

| | | | |
|---|---|---|---|
| 2,682,063 | 6/1954 | Miloche | 7/107 |
| 3,378,048 | 4/1968 | Wood et al. | 7/107 |
| 3,708,852 | 1/1973 | Mason | 29/749 |
| 3,803,649 | 4/1974 | Skutt et al. | 7/107 |
| 3,883,316 | 5/1975 | Mason | 29/751 |
| 4,161,061 | 7/1979 | Mason et al. | 29/566.4 |
| 4,169,310 | 10/1979 | Murphy | 29/751 |
| 4,241,496 | 12/1980 | Gregson | 29/751 |

*Primary Examiner*—Neil Abrams
*Attorney, Agent, or Firm*—John E. Wagner

[57] ABSTRACT

A tool for wire termination is disclosed in which the tool is fabricated from a pair of stamped tool ends, each with a working end and a tongue at the opposite end. The tongues are shaped with non circular, e.g., semi octagonal cross sections such that when the tongues are overlaid, they present a generally non circular, e.g., octagonal cross section region between the two working ends of the tool. A series of washers each with corresponding non circular shaped bores are strung on the tongues before the two tongues are overlaid. The assembly is then staked or otherwise secured together into a rigid structure. The method for producing the double ended tool as described above is also disclosed. The tool is to be secured in a bore of a handle by bayonet fastening using grooves in the washer stack. The tool is double ended for reversibility. The staking step may include use of a punch press die to upset the ends of the tongues to secure the washers.

19 Claims, 3 Drawing Sheets

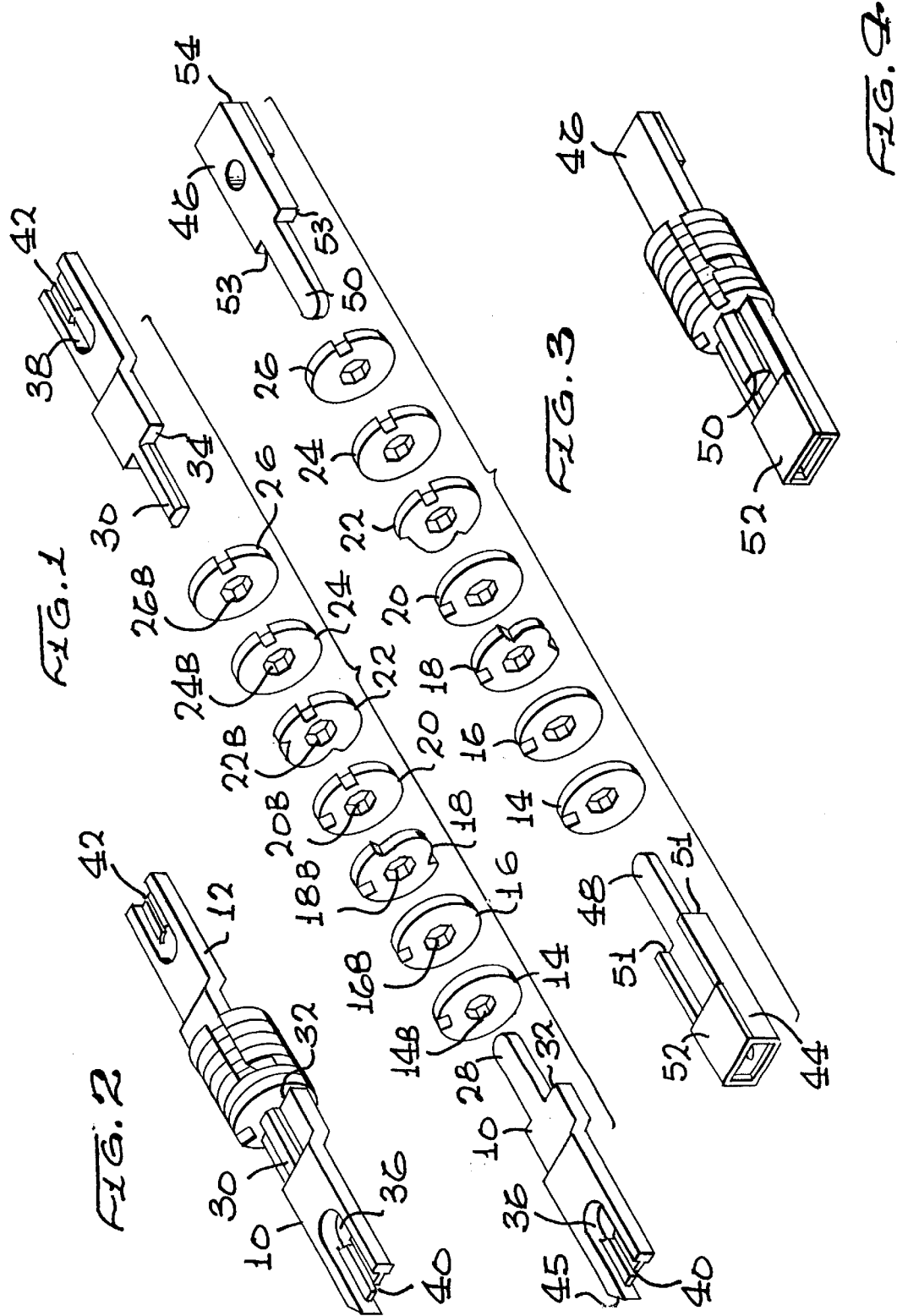

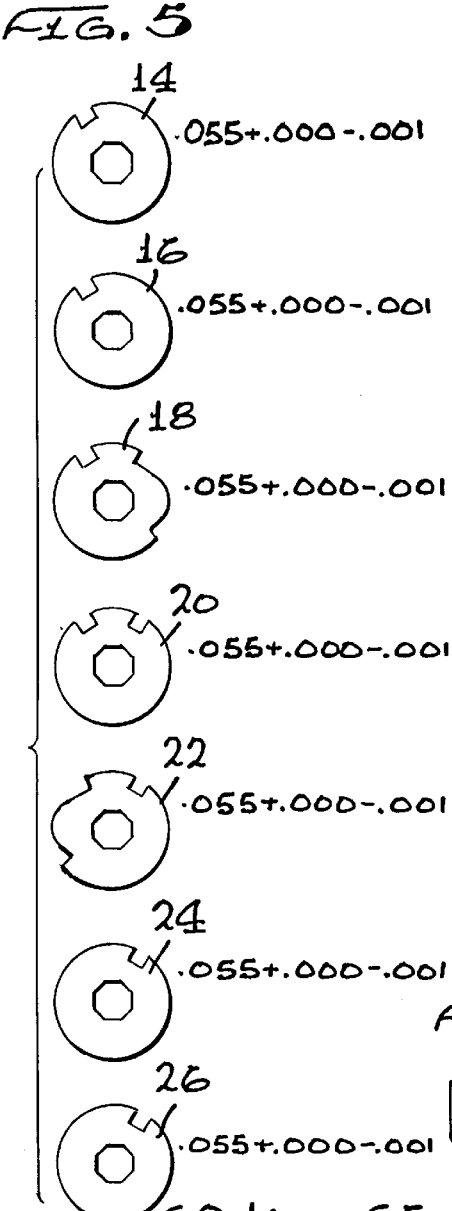
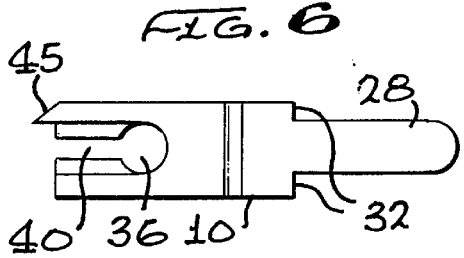
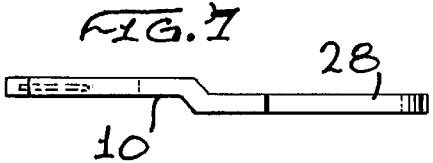
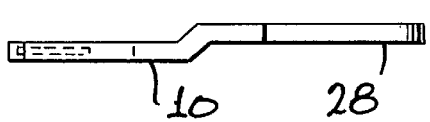
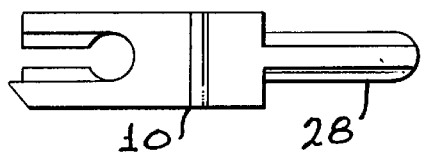
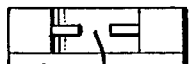
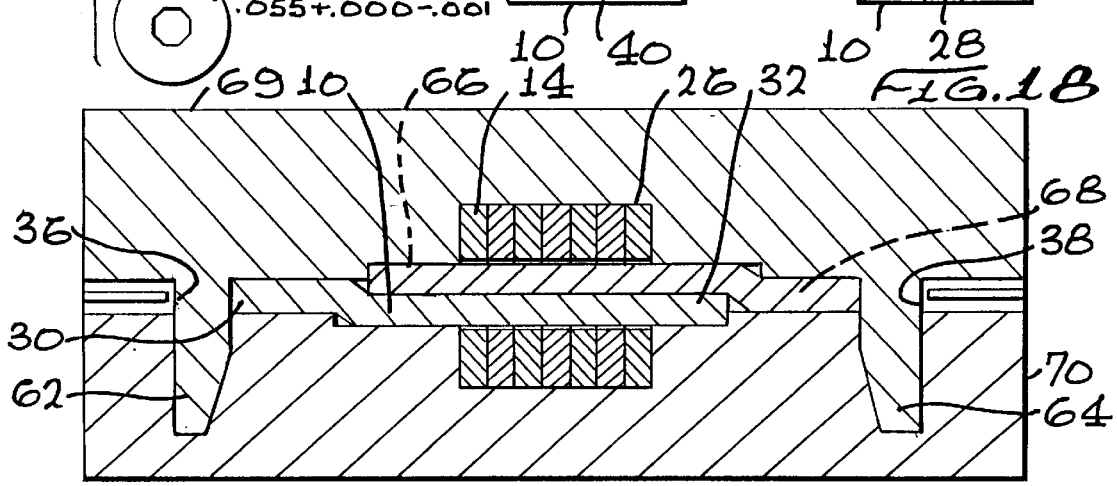

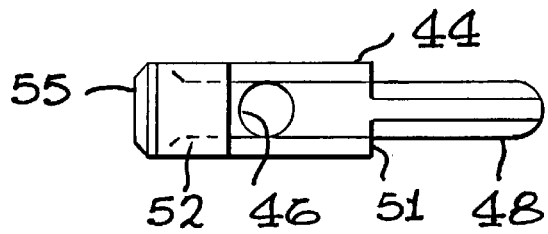
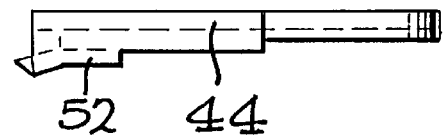
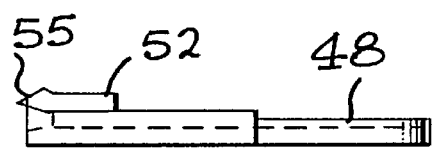
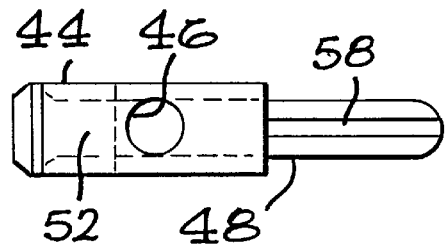
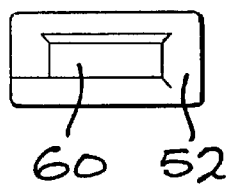
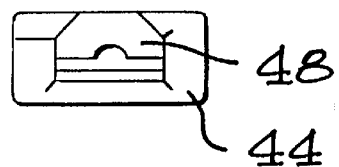

6,058,600

WIRE TERMINATION TOOL AND METHOD FOR PRODUCING THE SAME

BRIEF SUMMARY OF THE INVENTION

This invention relates to a wire termination tool and a method for assembling it. Wire termination tools are used in substantial numbers in the telephone industry as aids in connecting wires to distribution terminals. Such terminals are of two types which require somewhat different configurations of wire termination tools. In a "66" type of distribution block the termination tools have a box-shaped end which is slipped over an electrical contact. In the "110" type, the tool straddles the wire being terminated and forces it between prongs of the distribution terminal contact.

Each of the termination tool types are shown in U.S. Pat. No. 4,241,496 which describes in detail the Force Impact Termination Tool which acts both as a handle for the termination tools or blades which are described herein and as an impact hammer device for driving the blades to secure conductor wire to the electrical contacts of the two separate types. The patent describes tools for "88" and "66" type terminals and it is clear that "88" type blocks are similar to "110" types in that both require the box shaped end.

Wire termination tools of both types are used in substantial numbers and are normally formed as investment castings. While the tools are satisfactory in operation they tend to be somewhat expensive in the high quality standards required, largely because of the large number of rejected pieces and high labor costs of casting. Each tool normally includes a cutting edge for cutting the wires. The process for making such termination tools is such that grinding the cutting edge is at or near the last step in the manufacture. Often it is only at this step that flaws in the casting are discovered which require scrapping a piece which has substantially all the labor cost invested in it.

The wire termination tool of the invention is formed of stamped parts which are quite inexpensive and which are not subject to the hidden flaws inherent in castings. For either the "66" or "110" versions of the tool the parts consist of two stamped blades and a series of stamped washer-like members which are formed with notches on their outside edges and identical non circular inside bores, usually octagonal bores, which are stacked and aligned such that the notches define an "L" shaped groove which serves as part of a bayonet-type connector.

Such tools usually have a limited life because the cutting edges become dull with use. They are inserted into a handle assembly which includes the other part of the bayonet connector. When the tool becomes dull, the user removes it by giving it a twist of approximately a quarter-turn and then pulling it out of the handle. A new such tool is installed in the handle by aligning a groove on the tool with a projection in the handle, pushing the tool over the projection and locking the tool in position by giving it a quarter turn. This type of connector is well understood in the art and applies to both the cast prior art tool and to the tools of the invention.

Each of the blade members has a wire engaging end, an offset portion and, at its opposite end, a narrowed tongue which has a cross section which is substantially half the shape of the non circular (octagonal) inside bores.

When the stack of washer-like members is assembled and aligned, the stack is arranged over the tongues of two of the blade parts which includes shoulders limiting axial movement of the stack, and preventing rotational movement since the two tongues effectively fill the space defined by the octagonal bores. The assembled tool is then placed in a punch press or comparable tool which deforms the exposed portions of the tongues slightly causing them to expand against the washer-like members, effectively staking them in place.

BRIEF DESCRIPTION OF THE DRAWING(S)

This invention may be more clearly understood with the following detailed description and by reference to the drawings in which:

FIG. 1 is an exploded view of a wire termination tool according to my invention;

FIG. 2 is a perspective view of the assembled tool of FIG. 1;

FIG. 3 is an exploded view of another embodiment of my wire termination tool;

FIG. 4 is a perspective view of the assembled tool of FIG. 3;

FIG. 5 is an elevational view showing the series of washerlike members shown in FIGS. 1–4;

FIG. 6 is a top plan view of one of the blade parts of the tool of FIGS. 1 and 2;

FIG. 7 is a left side view of the part of FIG. 6;

FIG. 8 is a right side view of the part of FIGS. 6 and 7;

FIG. 9 is a bottom view of the part of FIGS. 6–8;

FIG. 10 is a view from one end of the part of FIGS. 6–9;

FIG. 11 is a view from one end of the part of FIGS. 6–10;

FIG. 12 is a top plan view of one of the blade parts of the tool of FIGS. 3 and 4;

FIG. 13 is a left side view of the part of FIG. 12;

FIG. 14 is a right side view of the part of FIGS. 12 and 13;

FIG. 15 is a bottom view of the part of FIGS. 12–14;

FIG. 16 is a view from one end of the part of FIGS. 12–15;

FIG. 17 is a view from the other end of the part of FIGS. 12–16.

FIG. 18 is a cross sectional view of a punch press die being used to secure the tool parts and discs into a rigid structure.

DETAILED DESCRIPTION

Referring now to FIG. 1, one embodiment of the invention is shown including a first blade 10, a second blade 12, and a series of washer-like discs 14–26. These discs are shown in a particular configuration as will appear below. Each disc has an interior bore which is octagonal or other non circular shape and all the bores are the same. These bores might be other than octagonal but must be non circular.

Blades 10 and 12 each include an offset end including tongues 28 and 30 respectively. These tongues have a half-octagonal cross section or one half of the non circular shape of the disc bores 14B–26B which enables them, when inserted into the bores of the discs 14–26 as shown on FIG. 2, to just fill the spaces in the discs and prevent rotational movement of the discs relative to blades 10 and 12. As assembled, blades 10 and 12 include shoulders 32 and 34 which prevent the discs from moving axially.

The opposite ends of blades 10 and 12 include bores 36 and 38 respectively, each of which terminate a slot 40, 42. Adjacent slot 40 is a cutting blade 45 which is used to cut the wire which is being terminated on a contact (not shown). As indicated above, this tool is used to force a wire between a pair of prongs on a contact. The tool is normally inserted into a handle having an internal projection which is part of a bayonet-type connector and the aligned notches shown on the stack of discs of FIG. 2 provide an "L" shaped slot forming the other part of the connector, as is well understood in the art.

The embodiment of FIGS. 3 and 4 is identical to that of FIGS. 1 and 2 except that the wire contacting ends of blades 44 and 46 include a box-like structure 52 which slips over the end of an electrical contact forming part of a distribution block terminal, as set forth above. Discs 14–26 are identical with those of FIGS. 1 and 2, and the tongues 48 and 50 have the same cross-section as tongues 28 and 30 and are inserted through the discs 14–26 and secure the stack in the same manner.

FIG. 5 shows the discs 14–26 in plan view with their radial orientation just as they must be to provide the desired grooves for the bayonet-type connector. Discs 14, 16, 18 and 20 all have a notch at roughly the 11 o'clock position and discs 20–26 have a notch at about the one o'clock position. Disc 20 has notches at both positions and discs 18 and 22 have elongated notches providing the latching parts of the connecting structure. Thus, either end of the tools of FIG. 2 and 4 may be inserted into the handle because the notches provide two "L" shaped connectors in each tool.

FIGS. 6 through 11 are, respectively, top, left side, right side, bottom, slot end, and tongue end views of blade 10. Blade 12 is identical except that it does not include the cutting edge 45.

FIG. 6 is a plan view as seen from the top of blade 10 and shows tongue 28, shoulders 32, bore 36, slot 40 and cutter 45. FIGS. 7 and 8 show the offset for the portion of the blade 10 including tongue 28. The bottom view, FIG. 9, is similar to FIG. 6 but also shows the semi-octagonal shape of the tongue. This is also shown on FIG. 11. FIG. 10 is a view from the slot end of blade 10 and shows that the sides of slot 40 are made thinner than the rest of blade 10.

FIG. 12 is a top plan view of blade 44 showing tongue 48, shoulder 51, a bore 46 and the box end 52 which carries a cutting edge 55. Also shown is the semi-octagonal or semi non circular configuration of the tongue which also appears in the end view FIG. 17. FIGS. 13 and 14 which are left and right side views of the tool of FIG. 12 show the additional height of the sidewalls and of the box end 52 with edge 55. FIG. 15 which is a bottom view of blade 44 shows a groove 58 which does not appear on the part as first formed, but is pressed in after assembly as shown in FIG. 4 and as discussed below. FIG. 16 is a view of blade 44 as seen from the box end showing that the stamped material is folded to create the box end 52 with the internal slot 60. Blade 46 is identical except that it does not include a cutting edge such as edge 55.

FIG. 18 is a cross sectional view of a punch press die with one of the blades 10 or 12, also shown in cross section installed and pressed to expand or upset the ends of tongues 30 and 32 such that they effectively stake the discs 14–26 in position. The tapered pins 62, 64 forming part of a die 66 pass through the bores 36, 38 and tend to force both of blades 10 and 12 toward the stack while the sharpened edges 66 and 68 of dies 69 and 70 force the ends of tongues 30 and 32 outwardly to secure the assembly together into a rigid structure.

The process of this invention comprises the steps of:

a) forming a pair of tool parts, each with a working end such as a blade and guide surfaces and a proximal or inner end in the form of a tongue. The tongue is of non circular configuration, e.g., semi octagonal. Forming is preferably done by stamping however, other metal forming techniques such as forming or die casting may be used;

b) forming a plurality of washer like discs, each with the non circular bore corresponding to the non circular shape produced by the two tongues, being overlaid with the non circular shapes exposed to form the shape of the bores, e.g., octagonal;

c) assembling the tool parts with the discs on the superimposed or juxtaposed tongues; and d) securing the tool parts and discs into a rigid member as by staking or brazing.

The above described embodiments of the present invention are merely descriptive of its principles and are not to be considered limiting. The scope of the present invention instead shall be determined from the scope of the following claims including their equivalents.

I claim:

1. A wire termination tool comprising a first blade having a slot extending longitudinally from one end and an offset portion including a tongue of smaller width on the other end having a half octagonal cross section;

a second blade having a slot extending longitudinally from one end and an offset portion including a tongue of smaller width on the outer end having a half octagonal cross section; and a stack of washer shaped members each having substantially indentical non circular internal bores, said washer shaped members being aligned such that said tongues pass through said bores, with groups of said washer shaped members having aligned exterior notches providing a bayonet-type fastening socket.

2. A wire termination tool as claimed in claim 1 wherein a circular opening is formed at the inside end of each of said slots.

3. A wire termination tool comprising a first metal blade and a second metal blade, each said blade having a wire engaging end and an opposite end including a tongue of reduced width having a half octagonal cross section comprising a half polygon cross section; and a stack of washer shaped metal members each having substantially identical polygonal octagonal bores, mating with said half polygonal tongues, said washer-shaped members being aligned such that said tongues pass through said bores with groups of said washers having exterior matches aligned to provide a fastening groove.

4. A wire termination tool in accordance with claim 3 wherein said exterior notches are aligned to provide a bayonet-type fastening groove.

5. A wire termination tool in accordance with claim 3 wherein said wire engaging ends are offset from said opposite ends such that said wire engaging ends extend from said stack along the same plane.

6. A wire termination tool in accordance with claim 3 wherein said wire engaging ends include an inwardly extending slot, a bore at the end of said slot, and one of said blades includes a sharpened edge.

7. A wire termination tool in accordance with claim 3 wherein said wire termination tool cooperates with a slotted wire termination prong and said wire engaging ends include an opening for receiving said wire termination prong.

8. A wire termination tool comprising a first stamped blade including a first portion having a bore and a slot reaching from said bore to the end of said portion and an offset portion including a narrow tongue on the opposite end of said blade from said slot;

a second stamped blade including at one end a narrow tongue having a half octagonal cross section on one side and a narrow groove on its opposite side, and a bore through said second stamped blade near the opposite end from said tongue; and a stack of washer shaped members each having an octagonal internal bore, said washer shaped members being aligned such that said tongues pass through said bores and are thereby prevented from radial movement relative to said stack, a first group of said washer shaped members having exterior slots aligned with each other to form an exterior groove extending from one end of said stack and a second group of said washer shaped members having exterior slots aligned with each other and radially spaced from said first group to form an exterior groove extending from the opposite end of said stack with a centrally located washer-shaped member being part of both said groups, and an internal washer in each said group having a sector of reduced diameter, said sectors being on opposite sides of said stack.

9. A wire termination tool as claimed in claim 8 wherein said second stamped blade includes a portion extending from its bore to its end opposite said tongue which is of greater thickness than the remaining part of said second stamped blade.

10. A method of producing a wire termination tool comprising the steps:
    a) stamping first and second blades each having a wire engaging end and an opposite end offset from said wire engaging end including a tongue of reduced width having a non circular cross section;
    b) stamping a series of washer-like metal members each having substantially identical non circular bores and external notches;
    c) stacking said members to form a stack such that said notches are aligned to provide a fastening groove;
    d) inserting the tongue of said first blade into said bores;
    e) inserting the tongue of said second blade into said bores at the end of said stack opposite to said first blade such that said tongues overlap in said bores; and
    f) forcibly deforming a portion of said blades against said members to secure said blades and said members together.

11. A method of producing a wire termination tool as claimed in claim 10 including the step of stamping said tongues into a half-octagonal cross-section and stamping said members to have substantially identical octagonal bores.

12. A wire termination tool manufactured by the process of claim 10.

13. A wire termination tool produced by the process of:
    a) forming a first tool end having a working tool at one end and a non circular cross section tongue at the opposite end;
    b) forming a second tool end having a working tool at one end and a non circular cross section tongue at the opposite end thereof;
    c) forming a plurality of discs having bores therethrough corresponding to the non circular shape of said tongue of said first and second tongues when placed in juxtaposition;
    d) assembling said washers and first and second tool parts with said tongues in juxtaposition and said discs in a stacked array between said surfaces of said first and second tool parts; and
    e) securing said washers and first and second parts into a rigid assembly.

14. A wire termination tool in accordance with claim 13 where in said tongues of said first and second parts are formed into semi octagonal shapes whereby said tongues may be made to form an octagonal cross sectional shape when placed in juxtaposition; and wherein said washers are formed with substantially identical octagonal bores therein corresponding to the octagonal shape and size of said juxtaposed tongues.

15. A wire termination tool in accordance with claim 13 wherein said step of forming said first and second parts is by stamping.

16. A wire termination tool in accordance with claim 13 wherein said step of forming said washers is by stamping.

17. A wire termination tool in accordance with claim 13 wherein said step of securing said washers and first and second parts into a rigid assembly is by staking.

18. A method of producing a wire termination tool comprising the steps:
    a) forming first and second blades each having a wire engaging end and opposite end offset from said wire engaging end including a tongue of reduced width having a non circular cross section;
    b) forming a series of washer like metal members each having substantially identical non circular bores and external notches;
    c) stacking said members and aligning said notches to form an L-shaped groove;
    d) inserting the tongues of said first blade into said bores;
    e) inserting the tongue of said second blade into said bores at the end of said stack opposite to said first blade such that said tongues overlap in said bores; and
    f) forcibly deforming a portion of said blades against said members to secure said blades and said members together.

19. A method of producing a wire termination tool as claimed in claim 18 including forming said tongues into a half octagonal cross-section and forming said members to have substantially identical octagonal bores.

* * * * *